(12) United States Patent
Fu

(10) Patent No.: US 12,381,655 B2
(45) Date of Patent: Aug. 5, 2025

(54) METHOD FOR DETERMINING HYBRID AUTOMATIC REPEAT REQUEST ACKNOWLEDGEMENT INFORMATION

(71) Applicant: BEIJING XIAOMI MOBILE SOFTWARE CO., LTD., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 18/282,986

(22) PCT Filed: Mar. 23, 2021

(86) PCT No.: PCT/CN2021/082466
§ 371 (c)(1),
(2) Date: Sep. 19, 2023

(87) PCT Pub. No.: WO2022/198458
PCT Pub. Date: Sep. 29, 2022

(65) Prior Publication Data
US 2024/0171313 A1    May 23, 2024

(51) Int. Cl.
*H04L 1/1607* (2023.01)
*H04L 1/1812* (2023.01)
*H04L 1/1829* (2023.01)

(52) U.S. Cl.
CPC .......... *H04L 1/1607* (2013.01); *H04L 1/1812* (2013.01); *H04L 1/1861* (2013.01)

(58) Field of Classification Search
CPC ... H04L 1/1607; H04L 1/1812; H04L 1/1861; H04L 1/1896; H04L 5/0055; H04L 1/1614; H04W 72/23
(Continued)

(56) References Cited

U.S. PATENT DOCUMENTS 11,489,635 B2 * 11/2022 Lei ................... H04W 72/0446
2018/0241510 A1 * 8/2018 Shen ......................... H04L 1/18
(Continued)

FOREIGN PATENT DOCUMENTS

KR     20200018141 A      2/2020
WO     WO-2020133247 A1 *  7/2020  ........... H04L 1/0027
(Continued)

OTHER PUBLICATIONS

PCT/CN2021/082466, International Search Report dated Dec. 2, 2021, 2 pages.
(Continued)

*Primary Examiner* — Albert Decady
*Assistant Examiner* — Osman M Alshack
(74) *Attorney, Agent, or Firm* — Cozen O'Connor

(57) ABSTRACT

A method for determining a hybrid automatic repeat request acknowledgement (HARQ-ACK) codebook, performed by a user equipment, including: determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH); and determining the HARQ-ACK codebook corresponding to the at least one piece of DCI according to the index parameter.

20 Claims, 3 Drawing Sheets

(58) Field of Classification Search
USPC .................................................. 714/748–750
See application file for complete search history.

(56) References Cited

U.S. PATENT DOCUMENTS

| | | | | |
|---|---|---|---|---|
| 2020/0022175 | A1* | 1/2020 | Xiong | H04L 5/001 |
| 2020/0127796 | A1* | 4/2020 | Li | H04L 1/1812 |
| 2020/0213044 | A1* | 7/2020 | Peng | H04L 1/1864 |
| 2020/0213981 | A1* | 7/2020 | Park | H04W 72/23 |
| 2020/0351025 | A1* | 11/2020 | Choi | H04L 1/0693 |
| 2020/0396760 | A1* | 12/2020 | Yi | H04L 1/1812 |
| 2021/0266941 | A1* | 8/2021 | Park | H04L 27/2607 |
| 2021/0282171 | A1* | 9/2021 | Wu | H04W 72/569 |
| 2021/0321438 | A1* | 10/2021 | Khoshnevisan | H04W 72/23 |
| 2022/0174707 | A1* | 6/2022 | Kim | H04W 72/23 |

FOREIGN PATENT DOCUMENTS

| | | |
|---|---|---|
| WO | WO 2020204560 A1 | 10/2020 |
| WO | WO 2020204561 A1 | 10/2020 |

OTHER PUBLICATIONS

Office Action dated Dec. 9, 2024 issued in Indian application No. 202347067655, 6 pages.

* cited by examiner

METHOD FOR DETERMINING HYBRID AUTOMATIC REPEAT REQUEST ACKNOWLEDGEMENT INFORMATION

CROSS-REFERENCE TO RELATED APPLICATION

This application is a U.S. national phase application of International Patent Application No. PCT/CN2021/082466, filed on Mar. 23, 2021, the entire contents of which are incorporated herein by reference.

FIELD

The present disclosure relates to the field of wireless communication technologies, and especially to a method for determining hybrid automatic repeat request acknowledgement (HARQ-ACK) information, an apparatus for determining hybrid automatic repeat request acknowledgement (HARQ-ACK) information, and a readable storage medium.

BACKGROUND

In a wireless communication network, one piece of downlink control information (DCI) may schedule one physical downlink shared channel (PDSCH) or one physical uplink shared channel (PUSCH) to ensure the flexibility of scheduling communications between devices in the network.

When a sub-carrier spacing (SCS) is 960 kHz, a corresponding time slot duration is ⅟₆₄ ms. When the sub-carrier spacing is larger and the time slot duration is smaller, in case that each PDSCH is scheduled with one piece of DCI individually, the blind detection overhead of the DCI will be too high.

In a multi transmission time interval (multi-TTI) design, one piece of DCI may schedule multiple PDSCHs/PUSCHs for time slots. An example in a multi-TTI PDSCH scheduling scenario is used for illustration. One piece of DCI may schedule four PDSCHs, and the four PDSCHs correspond to four consecutive time slots sequentially. The four PDSCHs may be used to transmit different data, that is, to transmit different transport blocks (TBs). Adopting the multi-TTI design may reduce the number of pieces of DCI, thus reducing the complexity of blindly detecting the DCI by a user equipment (UE). In the multi-TTI PDSCH scheduling scenario, the number of PDSCHs scheduled by one piece of DCI may be semi-statically configured by a high layer, or may be dynamically indicated by scheduled DCI after a numerical range is indicated by a protocol or a numerical range is configured by a high layer signaling.

In the multi-TTI PDSCH scheduling scenario, hybrid automatic repeat request acknowledgements (HARQ-ACKs) of a plurality of PDSCHs need to be fed back on the same physical uplink control channel (PUCCH).

SUMMARY

In a first aspect, an embodiment of the present disclosure provides a method for determining a hybrid automatic repeat request acknowledgement (HARQ-ACK). The method is performed by a user equipment (UE), or by a chip in the UE.

The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH), and determining a HARQ-ACK codebook corresponding to the at least one piece of DCI according to the index parameter. By adopting this method, a UE or terminal device 101 determines the index parameter (for example, a C-DAI and/or a T-DAI) according to the number of pieces of DCI scheduled by the network device, so that there is no need to increase a number of bits occupied by the index parameter. In the case that an original number of bits occupied by the index parameter is maintained (for example, a C-DAI and a T-DAI each occupy 2 bits), a type-2 HARQ-ACK codebook is accurately fed back.

In a second aspect, an embodiment of the present disclosure provides a method for determining a hybrid automatic repeat request acknowledgement (HARQ-ACK). The method is performed by a network device.

The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH), and determining the HARQ-ACK codebook corresponding to the at least one piece of DCI according to the index parameter.

In a third aspect, the present disclosure provides a communication device. The communication device includes a memory for storing computer programs, and a processor for executing the computer programs to implement the first aspect or any possible design of the first aspect.

In a fourth aspect, the present disclosure provides a communication device. The communication device includes a memory for storing computer programs, and a processor for executing the computer programs to implement the second aspect or any possible design of the second aspect.

In a fifth aspect, the present disclosure provides a computer-readable storage medium having stored therein instructions (or referred to as computer programs, programs) that, when invoked for execution on a computer, cause the computer to perform the first aspect or any possible design of the first aspect.

In a sixth aspect, the present disclosure provides a computer-readable storage medium having stored therein instructions (or referred to as computer programs, programs) that, when invoked for execution on a computer, cause the computer to perform the second aspect or any possible design of the second aspect.

It is to be understood that the foregoing general description and the following detailed description are illustrative and explanatory merely and are not restrictive of the present disclosure.

DETAILED DESCRIPTION

Embodiments of the present disclosure will now be further described with reference to the accompanying drawings and specific implementations.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the embodiments of the present disclosure. Instead, they are merely examples of apparatuses and methods consistent with aspects related to the disclosure as recited in the appended claims.

Figure 1:
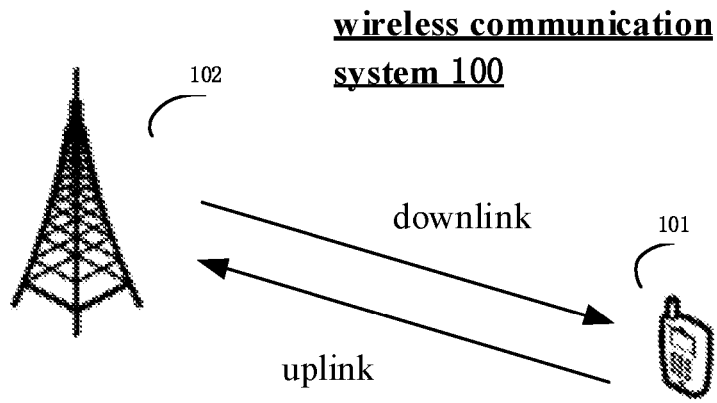
FIG. 1 is a schematic diagram showing a wireless communication system according to an illustrative embodiment.

As shown in FIG. 1, a method for determining hybrid automatic repeat request acknowledgement (HARQ-ACK) information provided in an embodiment of the present application may be applied to a wireless communication system 100. The wireless communication system 100 may include a terminal device 101 and a network device 102. The terminal device 101 is configured to support carrier aggregation. The terminal device 101 may be connected to a plurality of carrier units of the network device 102, including one primary carrier unit and one or more secondary carrier units.

It is to be understood that the above wireless communication system 100 is applicable to both a low frequency scenario (sub 6G) and a high frequency scenario (above 6 G). Application scenarios of the wireless communication system 100 include, but are not limited to, a long term evolution (LTE) system, a LTE frequency division duplex (FDD) system, a LTE time division duplex (TDD) system, a worldwide interoperability for micro wave access (WiMAX) communication system, a cloud radio access network (CRAN) system, a future 5th-Generation (5G) system, a new radio (NR) communication system, or a future evolved public land mobile network (PLMN) system, etc.

The terminal device 101 shown above may be a user equipment (UE), a terminal, an access terminal, a terminal unit, a terminal station, a mobile station (MS), a remote station, a remote terminal, a mobile terminal, a wireless communication device, a terminal agent, a terminal device, and the like. The terminal device 101 may have a wireless transmitting & receiving function, which may perform a communication (such as a wireless communication) with one or more network devices of one or more communication systems and accept a network service provided by a network device. The network device includes, but is not limited to, the network device 102 shown in the FIG. 1.

The terminal device 101 may be a cellular phone, a cordless phone, a session initiation protocol (SIP) phone, a wireless local loop (WLL) station, a personal digital assistant (PDA) device, a handheld device with a wireless communication function, a computing device or other processing devices connected to wireless modems, an in-vehicle device, a wearable device, a terminal device in a future 5G network, a terminal device in a future evolved PLMN network, or the like.

The network device 102 may be an access network device (or referred to as an access network station). The access network device refers to a device that provides a network access function, such as a radio access network (RAN) base station, and so on. The network device 102 may specifically include a base station (BS), or include a base station, a radio resource management device for controlling the base station, and the like. The network device 102 may also include a relay station (a relay device), an access point, a base station in the future 5G network, a base station in the future evolved PLMN network, an NR base station, or the like. The network device 102 may be a wearable device or an in-vehicle device. The network device 102 may also be a communication chip with a communication module.

For example, the network device 102 includes, but is not limited to, a gnodeB (gNB) in 5G, an evolved node B (eNB) in the LTE system, a radio network controller (RNC), a node B (NB) in a WCDMA system, a wireless controller and a base station controller (BSC) in the CRAN system, a base transceiver station (BTS) in a GSM system or a CDMA system, a home base station (for example, a home evolved node B, or a home node B (HNB)), a baseband unit (BBU), a transmitting and receiving point (TRP), a transmitting point (TP), a mobile switching center, or the like.

In a multi-TTI physical downlink shared channel (PDSCH) scheduling scenario, HARQ-ACKs of a plurality of PDSCHs scheduled by the same piece of downlink control information (DCI) should be fed back in the same physical uplink control channel (PUCCH). The UE determines, according to kl in the DCI and a time slot position of the last PDSCH, a time slot of the PUCCH fed back by the HARQ-ACKs of the plurality of PDSCHs.

The size of a type-2 HARQ-ACK codebook is dynamic. When using the DCI to schedule the PDSCH, a downlink assignment index (DAI) field in the DCI may be used for counting. The DAI includes a counter DAI (C-DAI) and a total DAI (T-DAI). The C-DAI occupies 2 bits, and the T-DAI occupies 2 bits. When merely a single carrier is configured in the UE 101, merely the C-DAI needs to be used, and when a multi-carrier is configured in the UE 101, both the C-DAI and the T-DAI need to be counted together.

In a R15/16 protocol, the DCI will merely schedule a single TB. Therefore, for a certain UE, in case that the base station uses a plurality of pieces of DCI to schedule a plurality of PDSCHs to feed back them on one PUCCH resource, the C-DAI and the T-DAI will be increased by 1 for each piece of DCI scheduled by the base station. In this case, the number of pieces of DCI is the same as the number of PDSCHs, and it may be considered that the C-DAI and the T-DAI are counted according to the number of pieces of DCI or the number of PDSCHs.

In the multi-TTI PDSCH scheduling scenario, one piece of DCI will schedule a plurality of PDSCHs. In this case, the number of pieces of DCI is not equal to the number of PDSCHs. Therefore, there is a need to reconsider how the C-DAI and the T-DAI are counted, and how the type-2 HARQ-ACK codebook is generated.

In case that the C-DAI and the T-DAI are counted according to the number of PDSCHs, since one piece of DCI schedules a plurality of PDSCHs, a number of bits occupied by the C-DAI and the T-DAI is increased, for example, to 4 bits or even 6 bits.

In case that the C-DAI and the T-DAI are counted according to the number of pieces of DCI, in some scheduling scenarios, the number of PDSCHs scheduled by one piece of DCI is dynamically indicated by the DCI, rather than semi-statically configured by a high layer. When one or more pieces of DCI are missed, the UE 101 does not know how many PDSCHs are scheduled by the DCI, so the UE 101 does not know how many NACKs need to be fed back for the plurality of PDSCHs scheduled by the DCI.

Figure 2:
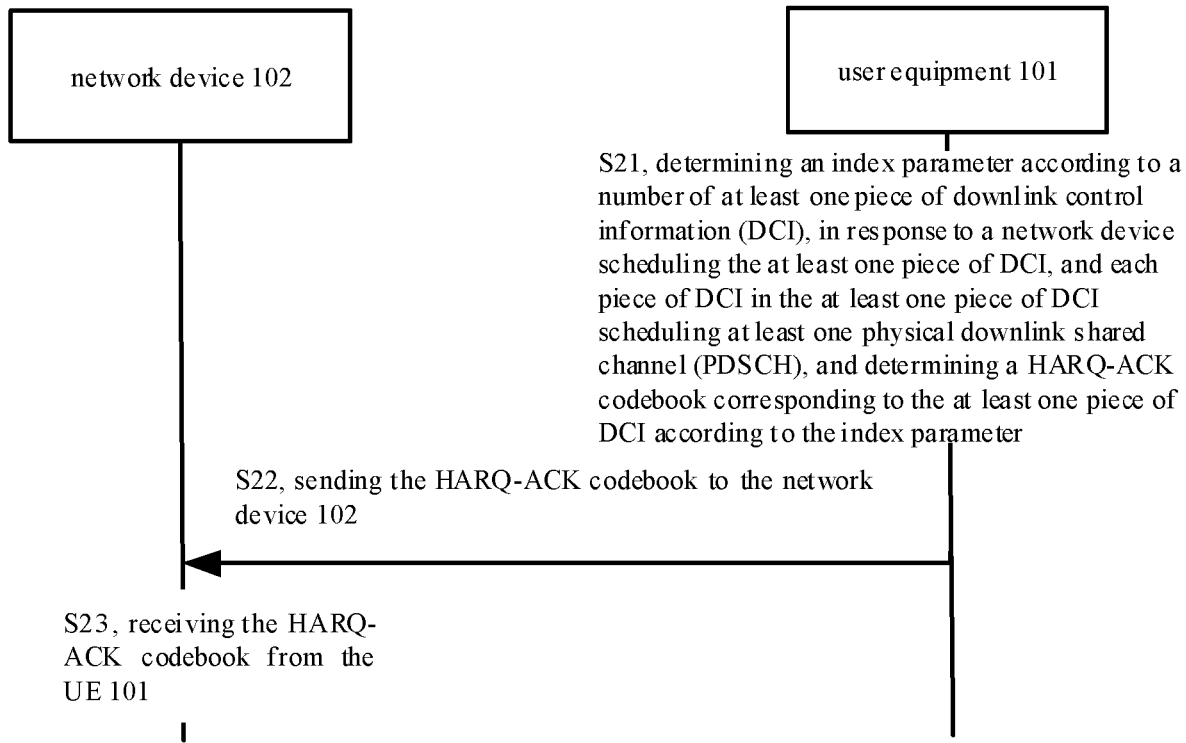
FIG. 2 is a flow chart showing a method for determining a hybrid automatic repeat request acknowledgement (HARQ-ACK) according to an illustrative embodiment.

An embodiment of the disclosure provides a method for determining a hybrid automatic repeat request acknowledgement (HARQ-ACK). Referring to FIG. 2, FIG. 2 is a flow chart showing a method for determining a hybrid automatic repeat request acknowledgement (HARQ-ACK) according to an illustrative embodiment. As shown in FIG. 2, the method includes steps as follows.

In step S21, a user equipment (UE) 101 determines an index parameter according to a number of at least one piece of downlink control information (DCI), in response to a network device scheduling the at least one piece of DCI, and each piece of DCI in the at least one piece of DCI scheduling at least one physical downlink shared channel (PDSCH). The UE 101 determines the HARQ-ACK codebook corresponding to the at least one piece of DCI according to the index parameter.

In some embodiments, the index parameter may include at least one of a counting downlink assignment index (C-DAI), or a total downlink assignment index (T-DAI).

In step S22, the UE 101 sends the HARQ-ACK codebook to the network device 102.

In step S23, the network device 102 receives the HARQ-ACK codebook from the UE 101.

In an embodiment of the present disclosure, the UE 101 determines the index parameter (for example, the C-DAI and/or the T-DAI) according to the number of pieces of DCI scheduled by the network device, so that there is no need to increase a number of bits occupied by the index parameter. In the case of maintaining an original number of bits occupied (for example, the C-DAI and the T-DAI each occupy 2 bits), a type-2 HARQ-ACK codebook is accurately fed back, which ensures the coordination and consistency of the size of the type-2 HARQ-ACK codebook between the network device 102 and the UE 101.

In the embodiment of the present disclosure, the above-mentioned solution may be applied to merely a C-DAI parameter, or to merely a T-DAI parameter, or to both C-DAI and T-DAI parameters. For example, in case that a downlink carrier is a single carrier, merely the C-DAI parameter is used to apply the above-mentioned solution. In case that a downlink carrier is a multi-carrier, both the C-DAI and T-DAI parameters are used to apply the above-mentioned solution.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter.

In some embodiments, the index parameter may include at least one of a counting downlink assignment index (C-DAI), or a total downlink assignment index (T-DAI).

In an embodiment of the present disclosure, the UE 101 determines the index parameter (for example, the C-DAI and/or the T-DAI) according to the number of pieces of DCI scheduled by the network device, so that there is no need to increase a number of bits occupied by the index parameter. In the case that an original number of bits occupied by the index parameter is maintained (for example, the C-DAI and the T-DAI each occupy 2 bits), a type-2 HARQ-ACK codebook is accurately fed back.

In the embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter. Missed DCI is determined according to the index parameter, and it is determined that all HARQ-ACKs corresponding to the missed DCI in the HARQ-ACK codebook are negative acknowledgements (NACKs).

In some embodiments, the index parameter may include at least one of a counting downlink assignment index (C-DAI), or a total downlink assignment index (T-DAI).

In some possible implementations, the above-mentioned embodiment further includes sending the HARQ-ACK codebook to the network device 102.

In an embodiment of the present disclosure, the UE 101 determines the missed DCI according to the index parameter, and for the missed DCI, determines that all HARQ-ACKs corresponding to the missed DCI in the HARQ-ACK codebook are the negative acknowledgements (NACKs), thus ensuring the coordination and consistency of the size of the type-2 HARQ-ACK codebook between the network device 102 and the UE 101, and conforming to a processing method of a missed scenario.

In the embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a first value. It is determined that a number of HARQ-ACKs corresponding to each piece of DCI in the HARQ-ACK codebook corresponding to the at least one piece of DCI is the first value, in which the first value is a maximum number of PDSCHs schedulable by a single piece of DCI.

In an implementation, determining the HARQ-ACK codebook corresponding to the at least one piece of DCI according to the index parameter and the first value includes determining missed DCI according to the index parameter, and determining that all HARQ-ACKs corresponding to the missed DCI in the HARQ-ACK codebook are negative acknowledgements (NACKs).

In some embodiments, the index parameter may include at least one of a counting downlink assignment index (C-DAI), or a total downlink assignment index (T-DAI).

In an embodiment of the present disclosure, the UE 101 determines that the number of HARQ-ACKs corresponding to normally received DCI and the missed DCI is the maximum number of PDSCHs schedulable by each piece of DCI, thus ensuring that the HARQ-ACK codebook contains HARQ-ACKs for each PDSCH.

In the embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a first value. It is determined that a number of HARQ-ACKs corresponding to each piece of DCI in the HARQ-ACK codebook corresponding to the at least one piece of DCI is the first value, in which the first value is the maximum number of PDSCHs schedulable by the single piece of DCI, which is configured by a high layer signaling or specified in a communication protocol.

In an implementation, determining the HARQ-ACK codebook corresponding to the at least one piece of DCI according to the index parameter and the first value includes determining missed DCI according to the index parameter, and determining that all HARQ-ACKs corresponding to the missed DCI in the HARQ-ACK codebook are negative acknowledgements (NACKs).

In some embodiments, the index parameter may include at least one of a counting downlink assignment index (C-DAI), or a total downlink assignment index (T-DAI).

In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, the UE 101 determines that the number of HARQ-ACKs corresponding to normally received DCI and the missed DCI is the maximum number of PDSCHs schedulable by each piece of DCI, ensuring that the HARQ-ACK codebook contains HARQ-ACKs for each PDSCH. The maximum number of PDSCHs schedulable by the single piece of DCI is configured by the high layer signaling or specified in the protocol, so that the UE 101 and the network device 102 accurately coordinate and unify the maximum number of PDSCHs schedulable by each piece of DCI.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter. Successfully received DCI is determined according to the index parameter, and it is determined that a HARQ-ACK of a scheduled PDSCH corresponding to the successfully received DCI is a demodulation result of the PDSCH, in which the HARQ-ACK of the scheduled PDSCH corresponding to the successfully received DCI included in the HARQ-ACK codebook is determined according to the demodulation result of the PDSCH.

The scheduled PDSCH corresponding to the successfully received DCI is a PDSCH actually scheduled by the DCI. For example, the maximum number of PDSCHs schedulable by a single piece of DCI corresponding to the DCI is eight, and the eight PDSCHs are PDSCH0 to PDSCH7. In fact, merely five PDSCHs are scheduled by the DCI, and the five PDSCHs are PDSCH0 to PDSCH4, so the five PDSCHs are the scheduled PDSCHs corresponding to the successfully received DCI.

In an implementation, determining the HARQ-ACK codebook corresponding to the at least one piece of DCI according to the index parameter includes determining missed DCI according to the index parameter, and determining that all HARQ-ACKs corresponding to the missed DCI in the HARQ-ACK codebook are negative acknowledgements (NACKs).

In an implementation, determining the HARQ-ACK codebook corresponding to the at least one piece of DCI according to the index parameter includes determining the HARQ-ACK codebook corresponding to the at least one piece of DCI according to the index parameter and a first value.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, for the successfully received DCI, the UE 101 determines that the HARQ-ACK of the scheduled PDSCH corresponding to the successfully received DCI is determined according to the demodulation result of the PDSCH, so that the HARQ-ACK of the scheduled PDSCH corresponding to the successfully received DCI conforms to an actual demodulation situation.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter. The successfully received DCI is determined according to the index parameter, and it is determined that a HARQ-ACK of an unscheduled PDSCH corresponding to the successfully received DCI is a NACK or an acknowledgement (ACK), in which the HARQ-ACK of the unscheduled PDSCH corresponding to the successfully received DCI included in the HARQ-ACK codebook is a NACK or an ACK.

The unscheduled PDSCH corresponding to the successfully received DCI is PDSCHs that are not actually scheduled within the maximum number of PDSCHs schedulable by a single piece of DCI. For example, the maximum number of PDSCHs schedulable by a single piece of DCI corresponding to the DCI is eight, and the eight PDSCHs are PDSCH0 to PDSCH7. In fact, merely five PDSCHs are scheduled by the DCI, and the five PDSCHs are PDSCH0 to PDSCH4, so the five PDSCHs are the scheduled PDSCHs corresponding to the successfully received DCI, and three PDSCHs (PDSCH 5 to PDSCH 7) other than the five PDSCHs are the unscheduled PDSCHs corresponding to the successfully received DCI. In an implementation, determining the HARQ-ACK codebook corresponding to the at least one piece of DCI according to the index parameter includes determining missed DCI according to the index parameter, and determining that all HARQ-ACKs corresponding to the missed DCI in the HARQ-ACK codebook are negative acknowledgements (NACKs). Successfully received DCI is determined according to the index parameter, and it is determined that a HARQ-ACK of a scheduled PDSCH corresponding to the successfully received DCI is a demodulation result of the PDSCH, in which the HARQ-ACK of the scheduled PDSCH corresponding to the successfully received DCI included in the HARQ-ACK codebook is determined according to the demodulation result of the PDSCH.

In an implementation, determining the HARQ-ACK codebook corresponding to the at least one piece of DCI according to the index parameter includes determining the HARQ-ACK codebook corresponding to the at least one piece of DCI according to the index parameter and a first value.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, for the successfully received DCI, the UE 101 determines that the HARQ-ACK of the unscheduled PDSCH corresponding to the successfully received DCI is the NACK or the ACK, so that a value of the unscheduled PDSCH may be selected from the NACK or the ACK, which will not cause adverse effects on the network device 102.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determining that a number of HARQ-ACKs corresponding to each piece of DCI in the HARQ-ACK codebook corresponding to the at least one piece of DCI is the second value, in which the second value is less than a maximum number of PDSCHs schedulable by a single piece of DCI.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, for normally received DCI and missed DCI, the UE 101 determines that the number of HARQ-ACKs corresponding to the normally received DCI and the missed DCI is the second value that is less than the maximum number of PDSCHs schedulable by the single piece of DCI, so that a number of bits occupied by the HARQ-ACK codebook may be saved while ensuring that the HARQ-ACK codebook accurately feeds back HARQ-ACK information.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value, in which the second value is less than a maximum number of PDSCHs schedulable by a single piece of DCI.

In some embodiments, the second value is configured by a high layer signaling or specified in a communication protocol.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, for normally received DCI and missed DCI, the UE 101 determines that the number of HARQ-ACKs corresponding to the normally received DCI and the missed DCI is the second value that is less than the maximum number of PDSCHs schedulable by the single piece of DCI, so that a number of bits occupied by the HARQ-ACK codebook may be saved while ensuring that the HARQ-ACK codebook accurately feeds back HARQ-ACK information. Moreover, the second value is configured by a high layer signaling or specified in a protocol, so that the UE 101 and the network device 102 accurately coordinate and unify the maximum number of PDSCHs schedulable by each piece of DCI.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value. The second value is a number that is less than the maximum number of PDSCHs schedulable by the single piece of DCI and is divisible by the maximum number of PDSCHs schedulable by the single piece of DCI.

The HARQ-ACK codebook is sent to the network device 102.

In an example, the maximum number of PDSCHs schedulable by the single piece of DCI is N, and the second value is M, where N=8, and M=4.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, for normally received DCI and missed DCI, the UE 101 determines that the number of HARQ-ACKs corresponding to the normally received DCI and the missed DCI is the second value that is less than the maximum number of PDSCHs schedulable by the single piece of DCI, so that a number of bits occupied by the HARQ-ACK codebook may be saved while ensuring that the HARQ-ACK codebook accurately feeds back HARQ-ACK information.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value. The second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value, and each packet includes some PDSCHs in PDSCHs corresponding to the successfully received DCI. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, the UE 101 divides the successfully received DCI into the second value of packets, each packet corresponds to one logical HARQ-ACK, and each logical HARQ-ACK corresponds to a logical processing result of HARQ-ACKs of all PDSCHs in one packet, so that the logical HARQ-ACK representatively denotes information of HARQ-ACKs of all PDSCHs in the packet, thus saving a number of bits occupied by the HARQ-ACK codebook while ensuring that the HARQ-ACK codebook accurately feeds back HARQ-ACK information.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value. The second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value, and each packet includes some PDSCHs in PDSCHs corresponding to the successfully received DCI. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a result of a logical AND of HARQ-ACKs of all PDSCHs in one packet.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, the UE 101 divides the successfully received DCI into the second value of packets, each packet corresponds to one logical HARQ-ACK, and each logical HARQ-ACK corresponds to the logical AND of HARQ-ACKs of all PDSCHs in one packet, so that the logical HARQ-ACK representatively denotes information of HARQ-ACKs of all PDSCHs in the packet. Especially, when HARQ-ACKs of all PDSCHs in the same packet are ACKs, a smaller bit is used to representatively denote information of HARQ-ACKs of all PDSCHs in the packet, thus saving a number of bits occupied by the HARQ-ACK codebook while ensuring that the HARQ-ACK codebook accurately feeds back HARQ-ACK information.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value. The second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value. Each packet includes at least one scheduled PDSCH. Each packet includes some PDSCHs in PDSCHs corresponding to the successfully received DCI. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

In an embodiment, the logical processing result is a result of a logical AND.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, the UE 101 divides the successfully received DCI into the second value of packets, each packet corresponds to one logical HARQ-ACK, each logical HARQ-ACK corresponds to a logical processing result of HARQ-ACKs of all PDSCHs in one packet, and each packet includes at least one scheduled PDSCH, so that the logical HARQ-ACK representatively denotes information of HARQ-ACKs of all PDSCHs in the packet, and representatively denotes HARQ-ACKs of the at least one scheduled PDSCH, thus saving a number of bits occupied by the HARQ-ACK codebook while ensuring that the HARQ-ACK codebook accurately feeds back HARQ-ACK information.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value. The second value is less than the maximum number of PDSCHs schedulable by the single piece of DCI. Successfully received DCI is determined according to the index parameter, and a plurality of packets corresponding to the successfully received DCI is determined, and each packet includes at least one scheduled PDSCH, in which a number of the plurality of packets is equal to the second value. Each packet includes some PDSCHs in PDSCHs corresponding to the successfully received DCI. It is determined that a HARQ-ACK of an unscheduled PDSCH corresponding to the successfully received DCI is an ACK. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

In an implementation, the logical processing result is a result of a logical AND.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, it is determined that the HARQ-ACK of the unscheduled PDSCH corresponding to the successfully received DCI in each packet is the ACK, so that the unscheduled PDSCH does not affect the logical processing result of the entire packet.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value. The second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value, and each packet includes some PDSCHs in PDSCHs corresponding to the successfully received DCI. At least one packet is included in the plurality of packets, and the at least one packet does not include the scheduled PDSCH. It is determined that a HARQ-ACK of an unscheduled PDSCH corresponding to the successfully received DCI is an ACK or a NACK. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

In an implementation, the logical processing result is a result of a logical AND.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, the UE 101 divides the successfully received DCI into the second value of packets, in which one or more packets merely include the unscheduled PDSCH, so that the scheduled PDSCH is more concentrated, thus saving a number of bits occupied by the HARQ-ACK codebook while ensuring that the HARQ-ACK codebook accurately feeds back HARQ-ACK information.

An embodiment of the present disclosure provides a method for determining a hybrid automatic repeat request acknowledgement (HARQ-ACK). The method is performed by a user equipment (UE) 101. The method includes determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value. The second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value, and each packet includes some PDSCHs in PDSCHs corresponding to the successfully received DCI. It is determined that a HARQ-ACK of a scheduled PDSCH corresponding to the successfully received DCI is a demodulation result of the PDSCH. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

In an implementation, the logical processing result is a result of a logical AND.

In some embodiments, the index parameter may include at least one of a counting downlink assignment index (C-DAI), or a total downlink assignment index (T-DAI). In an embodiment of the present disclosure, the above-mentioned solution may be applied to merely a C-DAI parameter, or to merely a T-DAI parameter, or to both C-DAI and T-DAI parameters. That is, merely the C-DAI parameter may be determined according to the number of pieces of DCI, and the T-DAI parameter may be determined in any possible way. It is also possible that merely the T-DAI parameter is determined according to the number of pieces of DCI, and the C-DAI parameter may be determined in any possible way. It is also possible that both the C-DAI and T-DAI parameters are determined according to the number of pieces of DCI.

In some possible implementations, the above-mentioned embodiment further includes sending the HARQ-ACK codebook to the network device 102.

In an embodiment of the present disclosure, for the successfully received DCI, the UE 101 determines that the HARQ-ACK of the scheduled PDSCH corresponding to the successfully received DCI is the demodulation result of the PDSCH, so that the HARQ-ACK of the scheduled PDSCH corresponding to the successfully received DCI conforms to an actual demodulation situation.

Two specific embodiments are used for illustration below.

Specific Embodiment One

In a multi-TTI PDSCH scheduling scenario, one piece of DCI schedules N PDSCHs. N is a maximum number of PDSCHs schedulable by a single piece of DCI. N is semi-statically configured by a high layer signaling or specified in a protocol.

A value of N is 8. The base station schedules four pieces of DCI, namely DCI0, DCI1, DCI2, and DCI3, and each piece of DCI schedules eight PDSCHs.

C-DAIs and T-DAIs corresponding to the four pieces of DCI are counted according to the number of pieces of DCI, not the number of PDSCHs.

A UE 101 generates a HARQ-ACK codebook according to the N, that is, a generated HARQ-ACK codebook includes 32 (i.e., 4*N) HARQ-ACKs, and each piece of DCI corresponds to N HARQ-ACKs. The 32 HARQ-ACKs are fed back on one physical uplink control channel (PUCCH).

The UE 101 may determine which DCI is missed according to the C-DAI and the T-DAI. A determination result is that the DCI2 is missed, and eight HARQ-ACKs are generated for eight PDSCHs corresponding to the DCI2. All the eight HARQ-ACKs are NACKs.

For successfully received DCI0, DCI1 and DCI3, a HARQ-ACK of each PDSCH in the eight PDSCHs corresponding to each piece of DCI corresponds to an actual demodulation result of a corresponding PDSCH.

Specific Embodiment Two

In a multi-TTI PDSCH scheduling scenario, a maximum number of PDSCHs schedulable by one piece of DCI is configured by a high layer signaling or specified in a protocol. An actual number N of PDSCHs scheduled by one piece of DCI is dynamically indicated by the DCI.

The maximum number of PDSCHs schedulable by one piece of DCI is 8. A base station schedules four pieces of DCI, namely DCI0, DCI1, DCI2 and DCI3. The DCI0 schedules 6 PDSCHs, the DCI1 schedules 6 PDSCHs, the DCI2 schedules 4 PDSCHs, and the DCI3 schedules 8 PDSCHs.

C-DAIs and T-DAIs corresponding to the four pieces of DCI are counted according to the number of pieces of DCI, not the number of PDSCHs.

A UE 101 generates a HARQ-ACK codebook according to the N, that is, a generated HARQ-ACK codebook includes 32 (i.e., 4*N) HARQ-ACKs, and each piece of DCI corresponds to N HARQ-ACKs. The 32 HARQ-ACKs are fed back on one physical uplink control channel (PUCCH).

The UE 101 may determine which DCI is missed according to the C-DAI and the T-DAI. A determination result is that the DCI2 is missed, and 8 NACKs are generated for 6 PDSCHs scheduled by the DCI2.

For successfully received DCI0, DCI1 and DCI3, the first six HARQ-ACKs corresponding to each piece of DCI determine the HARQ-ACKs according to actual demodulation results of 6 scheduled PDSCHs. For two pieces of information of HARQ-ACKs of unscheduled PDSCHs, NACKs or ACKs may be fed back.

Specific Embodiment Three

In a multi-TTI PDSCH scheduling scenario, one piece of DCI schedules N PDSCHs. N is a maximum number of PDSCHs schedulable by a single piece of DCI. N is semi-statically configured by a high layer signaling or specified in a protocol.

A value of N is 8. A base station schedules four pieces of DCI, namely DCI0, DCI1, DCI2 and DCI3, and each piece of DCI schedules eight PDSCHs.

The base station configures a second value M by a high layer signaling, or specifies a second value M in a protocol, where a value of M is 2.

C-DAIs and T-DAIs corresponding to the four pieces of DCI are counted according to the number of pieces of DCI, not the number of PDSCHs.

A UE 101 generates a HARQ-ACK codebook according to the M, that is, a generated HARQ-ACK codebook includes 8 (i.e., 4*M) HARQ-ACKs, and each piece of DCI corresponds to M HARQ-ACKs. The eight HARQ-ACKs are fed back on one physical uplink control channel (PUCCH).

The UE 101 may determine which DCI is missed according to the C-DAI and the T-DAI. A determination result is that the DCI2 is missed, and 2 HARQ-ACKs are generated for eight PDSCHs corresponding to the DCI2. Both the 2 HARQ-ACKs are NACKs.

HARQ-ACK binding processing is performed on successfully received DCI0, DCI1 and DCI3. Each piece of DCI corresponds to eight PDSCHs. For example, for the DCI1, one synthesized logical HARQ-ACK is obtained by performing logical AND processing according to the HARQ-ACKs of the first four PDSCHs in the eight PDSCHs. Another synthesized logical HARQ-ACK is obtained by performing logical AND processing according to the HARQ-ACKs of the last four PDSCHs in the eight PDSCHs. The two logical HARQ-ACKs are taken as two HARQ-ACKs corresponding to the DCI1.

Specific Embodiment Four

In a multi-TTI PDSCH scheduling scenario, a maximum number of PDSCHs schedulable by one piece of DCI is configured by a high layer signaling or specified in a protocol. An actual number N of PDSCHs scheduled by one piece of DCI is dynamically indicated by DCI.

The maximum number of PDSCHs schedulable by one piece of DCI is 8. A base station schedules four pieces of DCI, namely DCI0, DCI1, DCI2 and DCI3. The DCI0 schedules 6 PDSCHs, the DCI1 schedules 6 PDSCHs, the DCI2 schedules 4 PDSCHs, and the DCI3 schedules 8 PDSCHs.

The base station configures a second value M by a high layer signaling, or specifies a second value M in a protocol, where a value of M is 2.

C-DAIs and T-DAIs corresponding to the four pieces of DCI are counted according to the number of pieces of DCI, not the number of PDSCHs.

A UE 101 generates a HARQ-ACK codebook according to the M, that is, a generated HARQ-ACK codebook includes 8 (i.e. 4*M) HARQ-ACKs, and each piece of DCI corresponds to M HARQ-ACKs. The eight HARQ-ACKs are fed back on one physical uplink control channel (PUCCH).

The UE 101 may determine which DCI is missed according to the C-DAI and the T-DAI. A determination result is that the DCI2 is missed, and 2 HARQ-ACKs are generated for eight PDSCHs corresponding to the DCI2. Both the 2 HARQ-ACKs are NACKs.

HARQ-ACK binding processing is performed on successfully received DCI0, DCI1 and DCI3. For example, the DCI1 schedules six PDSCHs, and one synthesized logical HARQ-ACK is obtained by performing logical AND processing according to the HARQ-ACKs of the first four PDSCHs in the six PDSCHs, and another synthesized logical HARQ-ACK is obtained by performing logical AND processing according to the HARQ-ACKs of the last two PDSCHs in the six PDSCHs, and the two logical HARQ-ACKs are taken as two HARQ-ACKs corresponding to the DCI1.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH); and determining the HARQ-ACK codebook corresponding to the at least one piece of DCI according to the index parameter.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter. Missed DCI is determined according to the index parameter, and it is determined that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a first value. It is determined that a number of HARQ-ACKs corresponding to each piece of DCI in the HARQ-ACK codebook corresponding to the at least one piece of DCI is the first value, in which the first value is a maximum number of PDSCHs schedulable by a single piece of DCI.

In an implementation, determining the HARQ-ACK codebook corresponding to the at least one piece of DCI according to the index parameter and the first value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a first value. It is determined that a number of HARQ-ACKs corresponding to each piece of DCI in the HARQ-ACK codebook corresponding to the at least one piece of DCI is the first value, in which the first value is the maximum number of PDSCHs schedulable by the single piece of DCI, which is configured by a high layer signaling or specified in a protocol.

In an implementation, determining the HARQ-ACK codebook corresponding to the at least one piece of DCI according to the index parameter and the first value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a first value. Successfully received DCI is determined according to the index parameter, and it is determined that a HARQ-ACK of a scheduled PDSCH corresponding to the successfully received DCI is a demodulation result of the PDSCH, in which the HARQ-ACK of the scheduled PDSCH corresponding to the successfully received DCI included in the HARQ-ACK codebook is determined according to the demodulation result of the PDSCH. It is determined that a number of HARQ-ACKs corresponding to each piece of DCI in the HARQ-ACK codebook corresponding to the at least one piece of DCI is the first value, in which the first value is a maximum number of PDSCHs schedulable by a single piece of DCI.

In an implementation, determining the HARQ-ACK codebook corresponding to the at least one piece of DCI according to the index parameter and the first value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a first value. The successfully received DCI is determined according to the index parameter, and it is determined that a HARQ-ACK of an unscheduled PDSCH corresponding to the successfully received DCI is a NACK or an ACK, in which the HARQ-ACK of the unscheduled PDSCH corresponding to the successfully received DCI included in the HARQ-ACK codebook is a NACK or an ACK. It is determined that a number of HARQ-ACKs corresponding to each piece of DCI in the HARQ-ACK codebook corresponding to the at least one piece of DCI is the first value, in which the first value is a maximum number of PDSCHs schedulable by a single piece of DCI.

In an implementation, determining the HARQ-ACK codebook corresponding to the at least one piece of DCI according to the index parameter and the first value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH), and determining the HARQ-ACK codebook corresponding to the at least one piece of DCI according to the index parameter.

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value, in which the second value is less than a maximum number of PDSCHs schedulable by a single piece of DCI.

In an implementation, the determination method further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value, in which the second value is a value less than the maximum number of PDSCHs schedulable by the single piece of DCI, which is configured by a high layer signaling or specified in a protocol.

In an implementation, determining the HARQ-ACK codebook corresponding to the at least one piece of DCI according to the index parameter and the second value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value, in which the second value is a number that is less than the maximum number of PDSCHs schedulable by the single piece of DCI and is divisible by the maximum number of PDSCHs schedulable by the single piece of DCI.

In an implementation, determining the HARQ-ACK codebook corresponding to the at least one piece of DCI according to the index parameter and the second value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value, in which the second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value, and each packet includes some PDSCHs in PDSCHs corresponding to the successfully received DCI. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

In an implementation, determining the HARQ-ACK codebook corresponding to the at least one piece of DCI according to the index parameter and the second value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value, in which the second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value, and each packet includes some PDSCHs in PDSCHs corresponding to the successfully received DCI. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a result of a logical AND of HARQ-ACKs of all PDSCHs in one packet.

In an implementation, determining the HARQ-ACK codebook corresponding to the at least one piece of DCI according to the index parameter and the second value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value, in which the second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value, and each packet includes some PDSCHs in PDSCHs corresponding to the successfully received DCI. Each packet includes at least one scheduled PDSCH. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

In an implementation, determining the HARQ-ACK codebook corresponding to the at least one piece of DCI according to the index parameter and the second value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value, in which the second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value, and each packet includes some PDSCHs in PDSCHs corresponding to the successfully received DCI. It is determined that a HARQ-ACK of an unscheduled PDSCH corresponding to the successfully received DCI is an ACK. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

In an implementation, determining the HARQ-ACK codebook corresponding to the at least one piece of DCI according to the index parameter and the second value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value, in which the second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value, and each packet includes some PDSCHs in PDSCHs corresponding to the successfully received DCI. At least one packet is included in the plurality of packets, and the at least one packet does not include the scheduled PDSCH. It is determined that a HARQ-ACK of an unscheduled PDSCH corresponding to the successfully received DCI is an ACK or a NACK. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

In an implementation, determining the HARQ-ACK codebook corresponding to the at least one piece of DCI according to the index parameter and the second value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

An embodiment of the present disclosure provides a method for determining a hybrid automatic repeat request acknowledgement (HARQ-ACK). The method is performed by a network device 102. The method includes determining the HARQ-ACK codebook, in which the HARQ-ACK codebook is determined according to a following determination method: determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH).

The HARQ-ACK codebook corresponding to the at least one piece of DCI is determined according to the index parameter and a second value. It is determined that a number of HARQ-ACKs corresponding to each piece of DCI in the HARQ-ACK codebook corresponding to the at least one piece of DCI is the second value, in which the second value is less than the maximum number of PDSCHs schedulable by the single piece of DCI. Successfully received DCI is determined according to the index parameter, and a plurality of packets corresponding to the successfully received DCI is determined, in which a number of the plurality of packets is equal to the second value, and each packet includes some PDSCHs in PDSCHs corresponding to the successfully received DCI. It is determined that a HARQ-ACK of a scheduled PDSCH corresponding to the successfully received DCI is a demodulation result of the PDSCH. It is determined that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

In an implementation, determining the HARQ-ACK codebook corresponding to the at least one piece of DCI according to the index parameter and the second value further includes determining missed DCI according to the index parameter, and determining that all HARQ-ACKs corresponding to the missed DCI in the HARQ-ACK codebook are NACKs.

In an implementation, the index parameter may include at least one of a counting downlink assignment index (C-DAI), or a total downlink assignment index (T-DAI).

In an implementation, determining the HARQ-ACK codebook includes receiving the HARQ-ACK codebook from a user equipment (UE) 101.

Based on the same concept as the above-mentioned method embodiments, an embodiment of the present disclosure further provides a communication apparatus. The communication apparatus may have functions of the network device 102 in the above-mentioned method embodiments, and may be configured to perform steps performed by the network device 102 provided in the above-mentioned method embodiments. The function may be implemented by a hardware, a software, or a hardware executing a corresponding software. The hardware or the software includes one or more modules corresponding to the above functions.

Figure 3:
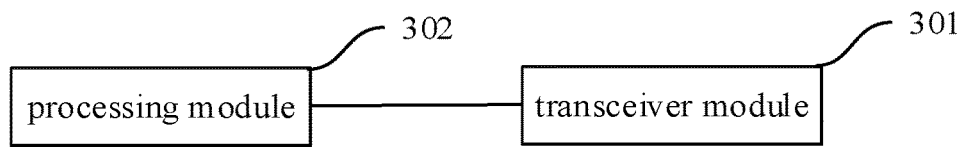
FIG. 3 is a schematic diagram showing an apparatus for determining a hybrid automatic repeat request acknowledgement (HARQ-ACK) applicable to a network device according to an illustrative embodiment.

In a possible implementation, a communication apparatus 300 shown in FIG. 3 may be used as a network device involved in the above-mentioned method embodiments, and perform steps performed by the network device in the above-mentioned method embodiments. As shown in FIG. 3, the communication apparatus 300 may include a transceiver module 301 and a processing module 302. The transceiver module 301 and a processing module 302 are coupled to each other. The transceiver module 301 may be configured to support the communication apparatus 300 to communicate. The transceiver module 301 may have a wireless communication function. For example, the transceiver module 301 may wirelessly communicate with other communication apparatuses via a wireless radio. The processing module 302 may be configured to support the communication apparatus 300 to perform processing actions in the above-mentioned method embodiments. The processing actions includes, but is not limited to, generating information and messages sent by the transceiver module 301, and/or demodulating and decoding signals received by the transceiver module 301.

When performing the steps implemented by the network device 102, the processing module 302 is configured to determine an index parameter according to a number of at least one piece of downlink control information (DCI), in response to a network device scheduling the at least one piece of DCI, and each piece of DCI in the at least one piece of DCI scheduling at least one physical downlink shared channel (PDSCH), and determine a hybrid automatic repeat request acknowledgement (HARQ-ACK) codebook corresponding to the at least one piece of DCI according to the index parameter. Alternatively, determining the HARQ-ACK codebook corresponding to the at least one piece of DCI according to the index parameter includes determining missed DCI according to the index parameter, and determining that all HARQ-ACKs corresponding to the missed DCI in the HARQ-ACK codebook are negative acknowledgements (NACKs).

Alternatively, determining the HARQ-ACK codebook corresponding to the at least one piece of DCI according to the index parameter includes determining the HARQ-ACK codebook corresponding to the at least one piece of DCI according to the index parameter and a first value, in which the method includes determining that a number of HARQ-ACKs corresponding to each piece of DCI in the HARQ-ACK codebook corresponding to the at least one piece of DCI is the first value, in which the first value is a maximum number of PDSCHs schedulable by a single piece of DCI.

Alternatively, the first value is the maximum number of PDSCHs schedulable by the single piece of DCI, which is configured by a high layer signaling or specified in a protocol.

Alternatively, determining the HARQ-ACK codebook corresponding to the at least one piece of DCI according to the index parameter includes determining successfully received DCI according to the index parameter, and determining that a HARQ-ACK of a scheduled PDSCH corresponding to the successfully received DCI is a demodulation result of the PDSCH, in which the HARQ-ACK of the scheduled PDSCH corresponding to the successfully received DCI included in the HARQ-ACK codebook is determined according to the demodulation result of the PDSCH.

Alternatively, determining the HARQ-ACK codebook corresponding to the at least one piece of DCI according to the index parameter includes determining the successfully received DCI according to the index parameter, and determining that a HARQ-ACK of an unscheduled PDSCH corresponding to the successfully received DCI is a NACK or an acknowledgement (ACK), in which the HARQ-ACK of the unscheduled PDSCH corresponding to the successfully received DCI included in the HARQ-ACK codebook is a NACK or an ACK.

Alternatively, determining the HARQ-ACK codebook corresponding to the at least one piece of DCI according to the index parameter includes determining the HARQ-ACK codebook corresponding to the at least one piece of DCI according to the index parameter and a second value, in which the method includes determining that a number of HARQ-ACKs corresponding to each piece of DCI in the HARQ-ACK codebook corresponding to the at least one piece of DCI is the second value, in which the second value is less than a maximum number of PDSCHs schedulable by a single piece of DCI.

Alternatively, the second value is a value less than the maximum number of PDSCHs schedulable by the single piece of DCI, which is configured by a high layer signaling or specified in a protocol.

Alternatively, the second value is a number that is less than the maximum number of PDSCHs schedulable by the single piece of DCI and is divisible by the maximum number of PDSCHs schedulable by the single piece of DCI.

Alternatively, determining the HARQ-ACK codebook corresponding to the at least one piece of DCI according to the index parameter includes determining successfully received DCI according to the index parameter, determining a plurality of packets corresponding to the successfully received DCI, in which a number of the plurality of packets is equal to the second value, and each packet includes some PDSCHs in PDSCHs corresponding to the successfully received DCI, and determining that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

Alternatively, the logical processing result is a result of a logical AND.

Alternatively, the method includes each packet including at least one scheduled PDSCH.

Alternatively, the method includes determining that a HARQ-ACK of an unscheduled PDSCH corresponding to the successfully received DCI is an ACK.

Alternatively, the method includes determining that a HARQ-ACK of an unscheduled PDSCH corresponding to the successfully received DCI is an ACK or a NACK, in response to at least one packet being included in the plurality of packets and the at least one packet not including the scheduled PDSCH.

Alternatively, determining the HARQ-ACK codebook corresponding to the at least one piece of DCI according to the index parameter includes determining that a HARQ-ACK of a scheduled PDSCH corresponding to the successfully received DCI is a demodulation result of the PDSCH.

Alternatively, communication apparatus further includes the transceiver module 301 configured to send the HARQ-ACK codebook to the network device.

Figure 4:
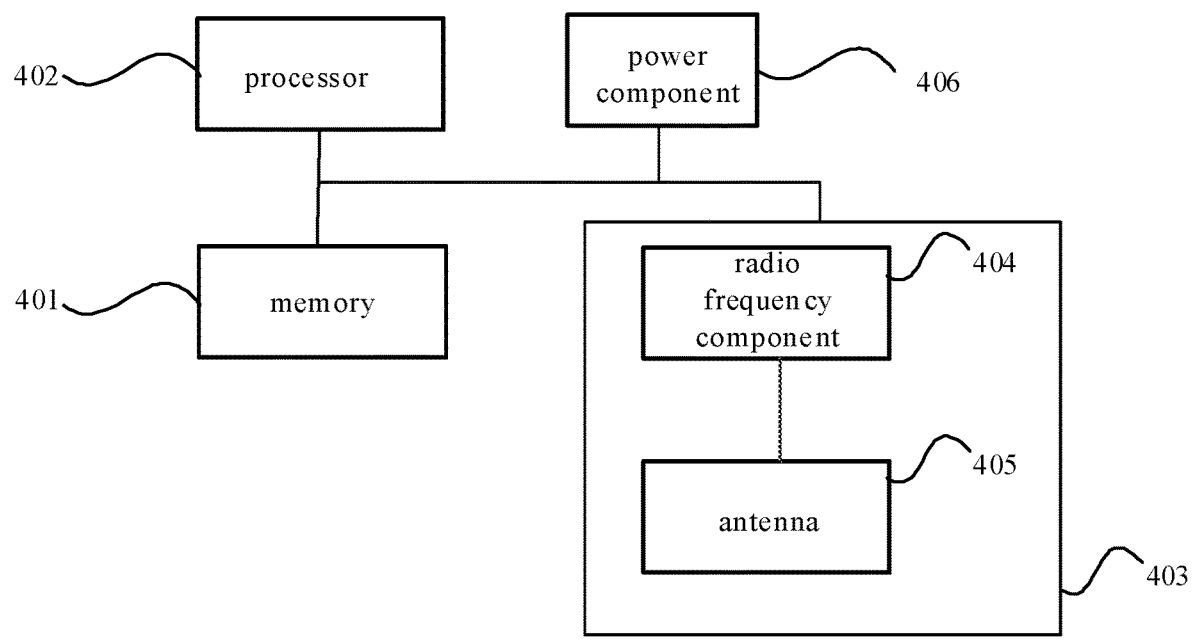
FIG. 4 is a schematic diagram showing another apparatus for determining a hybrid automatic repeat request acknowledgement (HARQ-ACK) applicable to a network device according to an illustrative embodiment.

When the communication apparatus is the network device 102, a structure of the communication apparatus may also be as shown in FIG. 4. A base station is taken as an example to explain the structure of the communication device. As shown in FIG. 4, a device 400 includes a memory 401, a processor 402, a transceiver component 403, and a power component 406. The memory 401 is coupled to the processor 402 and may be configured to store programs and data necessary for the communication device 400 to realize various functions. The processor 402 is configured to support the communication device 400 to perform the corresponding functions in the above-mentioned methods. The functions may be implemented by calling the programs stored in the memory 401. The transceiver component 403 may be a wireless transceiver, which may be configured to support the communication device 400 to receive signaling and/or data via a wireless radio and send signaling and/or data. The transceiver component 403 may also be referred to as a transceiver unit or a communication unit. The transceiver component 403 may include a radio frequency component 404 and one or more antennas 405. The radio frequency component 404 may be a remote radio unit (RRU), which may be configured for the transmission of radio frequency signals and the conversion between radio frequency signals and baseband signals. The one or more antennas 405 may be configured for the radiation and reception of radio frequency signals.

When the communication device 400 needs to send data, the processor 402 may perform baseband processing on the data to be sent, and then output the baseband signal to the radio frequency unit. The radio frequency unit performs the radio frequency processing on the baseband signal and then sends the radio frequency signal via the antenna in the form of electromagnetic waves. When data is sent to the communication device 400, the radio frequency unit receives the radio frequency signal via the antenna, converts the radio frequency signal into a baseband signal, and outputs the baseband signal to the processor 402. The processor 402 converts the baseband signal into data and processes the data.

Based on the same concept as the above-mentioned method embodiments, an embodiment of the present disclosure further provides a communication apparatus. The communication apparatus may have functions of the UE 101 in the above-mentioned method embodiments, and may be configured to perform steps performed by the UE 101 provided in the above-mentioned method embodiments. The function may be implemented by a hardware, a software, or a hardware executing a corresponding software. The hardware or the software includes one or more modules corresponding to the above functions.

Figure 5:
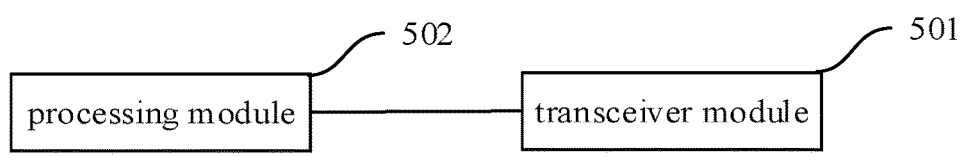
FIG. 5 is a schematic diagram showing another apparatus for determining a hybrid automatic repeat request acknowledgement (HARQ-ACK) applicable to a user equipment according to an illustrative embodiment.

In a possible implementation, a communication apparatus 500 shown in FIG. 5 may be used as a user equipment (UE) in the above-mentioned method embodiments, and perform steps performed by the UE in the above-mentioned method embodiments. As shown in FIG. 5, the communication apparatus 500 may include a transceiver module 501 and a processing module 502. The transceiver module 501 and the processing module 502 are coupled to each other. The transceiver module 501 may be configured to support the communication apparatus 500 to communicate. The transceiver module 501 may have a wireless communication function. For example, the transceiver module 501 may wirelessly communicate with other communication apparatuses via a wireless radio. The processing module 502 may be configured to support the communication apparatus 500 to perform processing actions in the above-mentioned method embodiments. The processing actions includes, but is not limited to, generating information and messages sent by the transceiver module 501, and/or demodulating and decoding signals received by the transceiver module 501.

When performing the steps implemented by the network device 102, the processing module 502 is configured to determine a hybrid automatic repeat request acknowledgement (HARQ-ACK) codebook, in which the HARQ-ACK codebook is determined according to a following determination method: determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH), and determining the HARQ-ACK codebook corresponding to the at least one piece of DCI according to the index parameter.

Alternatively, determining the HARQ-ACK codebook corresponding to the at least one piece of DCI according to the index parameter includes determining missed DCI according to the index parameter, and determining that all HARQ-ACKs corresponding to the missed DCI in the HARQ-ACK codebook are NACKs.

Alternatively, determining the HARQ-ACK codebook corresponding to the at least one piece of DCI according to the index parameter includes determining the HARQ-ACK codebook corresponding to the at least one piece of DCI according to the index parameter and a first value, in which the determination method includes determining that a number of HARQ-ACKs corresponding to each piece of DCI in the HARQ-ACK codebook corresponding to the at least one piece of DCI is the first value, in which the first value is a maximum number of PDSCHs schedulable by a single piece of DCI.

Alternatively, the first value is the maximum number of PDSCHs schedulable by the single piece of DCI, which is configured by a high layer signaling or specified in a protocol.

Alternatively, determining the HARQ-ACK codebook corresponding to the at least one piece of DCI according to the index parameter includes determining successfully received DCI according to the index parameter, and determining that a HARQ-ACK of a scheduled PDSCH corresponding to the successfully received DCI is a demodulation result of the PDSCH, in which the HARQ-ACK of the scheduled PDSCH corresponding to the successfully received DCI included in the HARQ-ACK codebook is determined according to the demodulation result of the PDSCH.

Alternatively, determining the HARQ-ACK codebook corresponding to the at least one piece of DCI according to the index parameter includes determining the successfully received DCI according to the index parameter, and determining that a HARQ-ACK of an unscheduled PDSCH corresponding to the successfully received DCI is a NACK or an ACK, in which the HARQ-ACK of the unscheduled PDSCH corresponding to the successfully received DCI included in the HARQ-ACK codebook is a NACK or an ACK.

Alternatively, determining the HARQ-ACK codebook corresponding to the at least one piece of DCI according to the index parameter includes determining the HARQ-ACK codebook corresponding to the at least one piece of DCI according to the index parameter and a second value, in which the determination method includes determining that a number of HARQ-ACKs corresponding to each piece of DCI in the HARQ-ACK codebook corresponding to the at least one piece of DCI is the second value, in which the second value is less than a maximum number of PDSCHs schedulable by a single piece of DCI.

Alternatively, the second value is a value less than the maximum number of PDSCHs schedulable by the single piece of DCI, which is configured by a high layer signaling or specified in a protocol.

Alternatively, the second value is a number that is less than the maximum number of PDSCHs schedulable by the single piece of DCI and is divisible by the maximum number of PDSCHs schedulable by the single piece of DCI.

Alternatively, determining the HARQ-ACK codebook corresponding to the at least one piece of DCI according to the index parameter includes determining successfully received DCI according to the index parameter, determining a plurality of packets corresponding to the successfully received DCI, in which a number of the plurality of packets is equal to the second value, and each packet includes some PDSCHs in PDSCHs corresponding to the successfully received DCI, and determining that a HARQ-ACK codebook corresponding to the successfully received DCI includes a plurality of logical HARQ-ACKs, in which a number of the plurality of logical HARQ-ACKs is equal to the second value, and each logical HARQ-ACK corresponds to a logical processing result of HARQ-ACKs of all PDSCHs in one packet.

Alternatively, the logical processing result is a result of a logical AND.

Alternatively, the determination method includes each packet including at least one scheduled PDSCH.

Alternatively, the determination method includes determining that a HARQ-ACK of an unscheduled PDSCH corresponding to the successfully received DCI is an ACK.

Alternatively, the determination method includes determining that a HARQ-ACK of an unscheduled PDSCH corresponding to the successfully received DCI is an ACK or a NACK, in response to at least one packet being included in the plurality of packets and the at least one packet not including the scheduled PDSCH.

Alternatively, determining the HARQ-ACK codebook corresponding to the at least one piece of DCI according to the index parameter includes determining that a HARQ-ACK of a scheduled PDSCH corresponding to the successfully received DCI is a demodulation result of the PDSCH.

Alternatively, determining the HARQ-ACK codebook includes receiving the HARQ-ACK codebook from a user equipment.

It is to be understood that specific process of each module performing the above corresponding steps has been described in detail in the above-mentioned method embodiments, which will not be elaborated herein for brevity.

Figure 6:
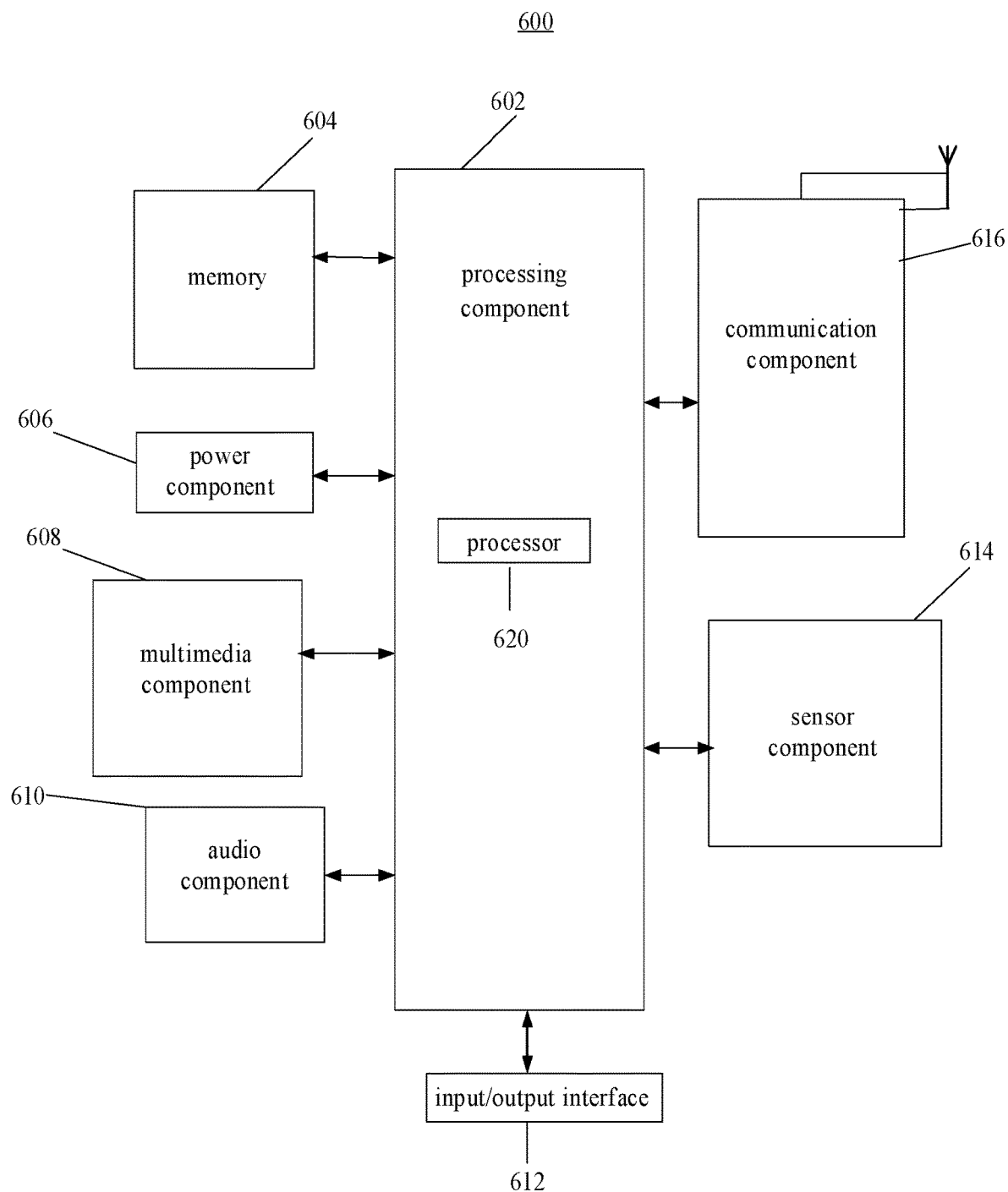
FIG. 6 is a schematic diagram showing another apparatus for determining a hybrid automatic repeat request acknowledgement (HARQ-ACK) applicable to a user equipment according to an illustrative embodiment.

When the communication apparatus is the UE 101, a structure of the communication apparatus may also be as shown in FIG. 6. A device 600 may be a mobile phone, a computer, a digital broadcast terminal, a messaging device, a game console, a tablet device, a medical device, a fitness device, a personal digital assistant, or the like. Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, phone calls, data communications, camera operations, and recording operations. The processing component 602 can include one or more processors 620 to execute instructions to perform all or some of the steps in the above-described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode.

The I/O interface 612 provides an interface between the processing component 602 and peripheral interface modules, such as keyboards, click wheels, buttons, and the like.

The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600.

The communication component 616 is configured to facilitate communication, wired or wireless, between the device 600 and other devices. The device 600 can access a wireless network based on a communication standard, such as WiFi, 2G, or 3G, or a combination thereof.

In an illustrative embodiment, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an illustrative embodiment, there is also provided a non-transitory computer readable storage medium including instructions, such as included in the memory 604, executable by the processor 6020 in the device 600, for completing the above-mentioned method. For example, the non-transitory computer-readable storage medium may be a ROM, a random access memory (RAM), a CD-ROM, a magnetic tape, a floppy disc, an optical data storage device, and the like.

Other embodiments of the present disclosure will be apparent to those skilled in the art from consideration of the specification and practice of the embodiment of the present disclosure described here. The present disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes can be made without departing from the scope thereof. It is intended that the scope of the embodiments of the present disclosure only be limited by the appended claims.

INDUSTRIAL APPLICABILITY

A user equipment (UE) 101 determines an index parameter (for example, a C-DAI and/or a T-DAI) according to a number of pieces of DCI scheduled by a network device, so that there is no need to increase a number of bits occupied by the index parameter. In the case that an original number of bits occupied by the index parameter is maintained (for example, a C-DAI and a T-DAI occupy 2 bits, respectively), a type-2 HARQ-ACK codebook is accurately fed back.

What is claimed is:

1. A method for determining a hybrid automatic repeat request acknowledgement (HARQ-ACK) codebook, performed by a user equipment, comprising:
   determining an index parameter according to a number of at least one piece of downlink control information (DCI), in response to a network device scheduling the at least one piece of DCI, and each piece of DCI in the at least one piece of DCI scheduling at least one physical downlink shared channel (PDSCH); and
   determining the HARQ-ACK codebook corresponding to the at least one piece of DCI according to the index parameter, comprising:
      determining the HARQ-ACK codebook corresponding to the at least one piece of DCI according to the index parameter and a value that is less than a maximum number of PDSCHs schedulable by a single piece of DCI, comprising:
         determining that a number of HARQ-ACKs corresponding to each piece of DCI in the HARQ-ACK codebook corresponding to the at least one piece of DCI is the value.

2. The method for determining the HARQ-ACK codebook of claim 1, wherein determining the HARQ-ACK codebook corresponding to the at least one piece of DCI according to the index parameter further comprises:
   determining missed DCI according to the index parameter, and determining that all HARQ-ACKs corresponding to the missed DCI in the HARQ-ACK codebook are negative acknowledgements (NACKs).

3. The method for determining the HARQ-ACK codebook of claim 1, wherein
   the value is configured by a high layer signaling or specified in a protocol, or
   the value is divisible by the maximum number of PDSCHs schedulable by the single piece of DCI.

4. The method for determining the HARQ-ACK codebook of claim 1, wherein determining the HARQ-ACK codebook corresponding to the at least one piece of DCI according to the index parameter and the value comprises:
   determining successfully received DCI according to the index parameter, determining a plurality of packets corresponding to the successfully received DCI, wherein a number of the plurality of packets is equal to the value, and each packet comprises some PDSCHs in PDSCHs corresponding to the successfully received DCI, and
   determining that a HARQ-ACK codebook corresponding to the successfully received DCI comprises a plurality of logical HARQ-ACKs, wherein a number of the plurality of logical HARQ-ACKs is equal to the value, and each logical HARQ-ACK corresponds to a logical processing result of HARQ-ACKs of all PDSCHs in one packet,
   wherein the logical processing result is a result of a logical AND.

5. The method for determining the HARQ-ACK codebook of claim 4, comprising:
   each packet comprising at least one scheduled PDSCH,
   determining that a HARQ-ACK of an unscheduled PDSCH corresponding to the successfully received DCI is an ACK, or
   determining that a HARQ-ACK of an unscheduled PDSCH corresponding to the successfully received DCI is an ACK or a NACK, in response to at least one packet being included in the plurality of packets and the at least one packet not including the scheduled PDSCH.

6. The method for determining the HARQ-ACK codebook of claim 4, wherein determining the HARQ-ACK codebook corresponding to the at least one piece of DCI according to the index parameter further comprises:
determining that a HARQ-ACK of a scheduled PDSCH corresponding to the successfully received DCI is a demodulation result of the PDSCH.

7. The method for determining the HARQ-ACK codebook of claim 1, comprising:
sending the HARQ-ACK codebook to the network device.

8. A non-transitory computer-readable storage medium having stored therein instructions that, when executed on a computer, cause the computer to perform the method of claim 1.

9. A method for determining a hybrid automatic repeat request acknowledgement (HARQ-ACK) codebook, performed by a network device, comprising:
determining the HARQ-ACK codebook;
wherein the HARQ-ACK codebook is determined according to a following determination method:
determining an index parameter according to a number of at least one piece of downlink control information (DCI), in response to the network device scheduling the at least one piece of DCI, and each piece of DCI in the at least one piece of DCI scheduling at least one physical downlink shared channel (PDSCH); and
determining the HARQ-ACK codebook corresponding to the at least one piece of DCI according to the index parameter, comprising:
determining the HARQ-ACK codebook corresponding to the at least one piece of DCI according to the index parameter and a value that is less than a maximum number of PDSCHs schedulable by a single piece of DCI;
wherein the determination method comprises:
determining that a number of HARQ-ACKs corresponding to each piece of DCI in the HARQ-ACK codebook corresponding to the at least one piece of DCI is the value.

10. The method for determining the HARQ-ACK codebook of claim 9, wherein determining the HARQ-ACK codebook corresponding to the at least one piece of DCI according to the index parameter further comprises:
determining missed DCI according to the index parameter, and determining that all HARQ-ACKs corresponding to the missed DCI in the HARQ-ACK codebook are NACKs.

11. The method for determining the HARQ-ACK codebook of claim 9, wherein
the value is configured by a high layer signaling or specified in a protocol, or
the value is divisible by the maximum number of PDSCHs schedulable by the single piece of DCI.

12. The method for determining the HARQ-ACK codebook of claim 9, wherein determining the HARQ-ACK codebook corresponding to the at least one piece of DCI according to the index parameter and the value comprises:
determining successfully received DCI according to the index parameter, determining a plurality of packets corresponding to the successfully received DCI, wherein a number of the plurality of packets is equal to the value, and each packet comprises some PDSCHs in PDSCHs corresponding to the successfully received DCI, and
determining that a HARQ-ACK codebook corresponding to the successfully received DCI comprises a plurality of logical HARQ-ACKs, wherein a number of the plurality of logical HARQ-ACKs is equal to the value, and each logical HARQ-ACK corresponds to a logical processing result of HARQ-ACKs of all PDSCHs in one packet,
wherein the logical processing result is a result of a logical AND.

13. The method for determining the HARQ-ACK codebook of claim 12, wherein the determination method comprises at least one of:
each packet comprising at least one scheduled PDSCH,
determining that a HARQ-ACK of an unscheduled PDSCH corresponding to the successfully received DCI is an ACK, or
determining that a HARQ-ACK of an unscheduled PDSCH corresponding to the successfully received DCI is an ACK or a NACK, in response to at least one packet being included in the plurality of packets and the at least one packet not including the scheduled PDSCH.

14. The method for determining the HARQ-ACK codebook of claim 12, wherein determining the HARQ-ACK codebook corresponding to the at least one piece of DCI according to the index parameter further comprises:
determining that a HARQ-ACK of a scheduled PDSCH corresponding to the successfully received DCI is a demodulation result of the PDSCH.

15. The method for determining the HARQ-ACK codebook of claim 9, wherein
determining the HARQ-ACK codebook comprises receiving the HARQ-ACK codebook from a user equipment.

16. A communication device, comprising:
a memory for storing computer programs; and
a processor for executing the computer programs to implement the method of claim 9.

17. A non-transitory computer-readable storage medium having stored therein instructions that, when executed on a computer, cause the computer to perform the method of claim 9.

18. A communication device, comprising:
a memory for storing computer programs; and
a processor for executing the computer programs to:
determine an index parameter according to a number of at least one piece of downlink control information (DCI), in response to a network device scheduling the at least one piece of DCI, and each piece of DCI in the at least one piece of DCI scheduling at least one physical downlink shared channel (PDSCH);
determine a HARQ-ACK codebook corresponding to the at least one piece of DCI according to the index parameter and a value that is less than a maximum number of PDSCHs schedulable by a single piece of DCI; and
determine that a number of HARQ-ACKs corresponding to each piece of DCI in the HARQ-ACK codebook corresponding to the at least one piece of DCI is the value.

19. The communication device according to claim 18, wherein the processor is configured to:
determine missed DCI according to the index parameter, and determining that all HARQ-ACKs corresponding to the missed DCI in the HARQ-ACK codebook are negative acknowledgements (NACKs).

20. The communication device according to claim 18, wherein the processor is configured to:
determine successfully received DCI according to the index parameter, determine a plurality of packets corresponding to the successfully received DCI, wherein a number of the plurality of packets is equal to the value, and each packet comprises some PDSCHs in PDSCHs corresponding to the successfully received DCI, and determine that a HARQ-ACK codebook corresponding to the successfully received DCI comprises a plurality of logical HARQ-ACKs, wherein a number of the plurality of logical HARQ-ACKs is equal to the value, and each logical HARQ-ACK corresponds to a logical processing result of HARQ-ACKs of all PDSCHs in one packet, wherein the logical processing result is a result of a logical AND.

* * * * *